United States Patent [19]

Fritz et al.

[11] Patent Number: 5,193,761
[45] Date of Patent: Mar. 16, 1993

[54] OPTICAL FIBER PACKAGE AND METHOD OF MAKING

[75] Inventors: Douglas E. Fritz, Lilburn; Clyde J. Lever, Jr., Buford; Danny E. West, Norcross, all of Ga.

[73] Assignee: AT&T Bell Laboratories, Murray Hill, N.J.

[21] Appl. No.: 807,039

[22] Filed: Dec. 11, 1991

Related U.S. Application Data

[63] Continuation-in-part of Ser. No. 708,414, May 31, 1991, abandoned.

[51] Int. Cl.$^5$ .................... B65H 55/00; B65H 55/04
[52] U.S. Cl. ..................... 242/159; 242/18 G; 242/25 R; 242/47; 242/54 R; 242/176
[58] Field of Search ............ 242/159, 174, 176, 117, 242/118.7, 47, 54 R, 25 R, 18 R, 18 G

[56] References Cited

U.S. PATENT DOCUMENTS

| | | | |
|---|---|---|---|
| 3,368,765 | 2/1968 | O'Grady | 242/25 A |
| 3,596,844 | 8/1971 | Engmann | 242/25 A |
| 3,610,549 | 10/1971 | Wennerstrom et al. | 242/176 |
| 4,545,542 | 10/1985 | Frazee, Jr. et al. | 242/18 A |
| 4,696,438 | 9/1987 | Myers | 242/159 |
| 4,848,687 | 7/1989 | Myers et al. | 242/18 A |
| 4,925,125 | 5/1990 | Le Compte | 242/159 |
| 4,961,545 | 10/1990 | Le Compte | 242/159 |

FOREIGN PATENT DOCUMENTS

WO90/04562 5/1990 PCT Int'l Appl. ............ 242/159

Primary Examiner—Stanley N. Gilreath
Attorney, Agent, or Firm—E. W. Somers; D. E. Hanes, Jr.

[57] ABSTRACT

A package (20) of wound optical fiber (22) includes a spool (23) on which are wound a plurality of layers with each layer comprising a plurality of convolutions of the optical fiber. The winding is accomplished such that each successive convolution is spaced from a preceding convolution. The spacing is such that on the third and further outer layers, each optical fiber is tangent to each of two adjacent convolutions of a previously wound layer and to one convolution of the next inner layer. Also, each convolution in each layer after an innermost layer crosses transversely optical fiber of an immediately preceding layer in two relatively closely spaced locations and such that crossovers in successive layers are staggered circumferentially of a winding surface. Because of the nesting which is caused to occur, excellent density, package rigidity and stability are achieved. Further, winding abnormalities such as crossovers are substantially reduced, resulting in a package of optical fiber which exhibits very low loss due to winding.

14 Claims, 4 Drawing Sheets

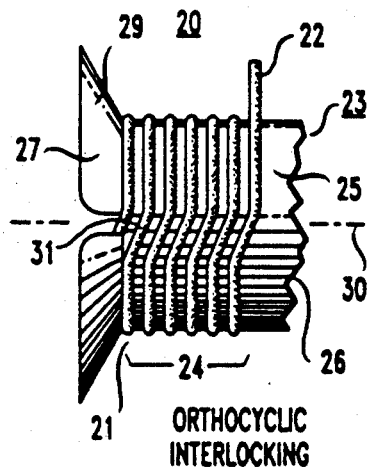
FIG. 1 ORTHOCYCLIC INTERLOCKING WIND
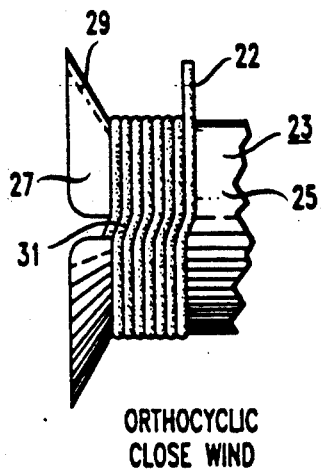
FIG. 2 (PRIOR ART) ORTHOCYCLIC CLOSE WIND
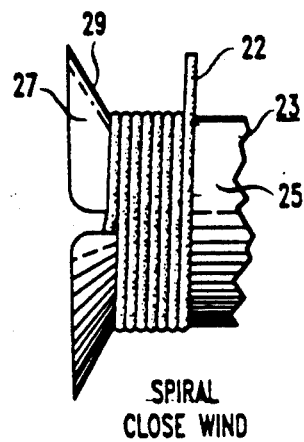
FIG. 3 (PRIOR ART) SPIRAL CLOSE WIND
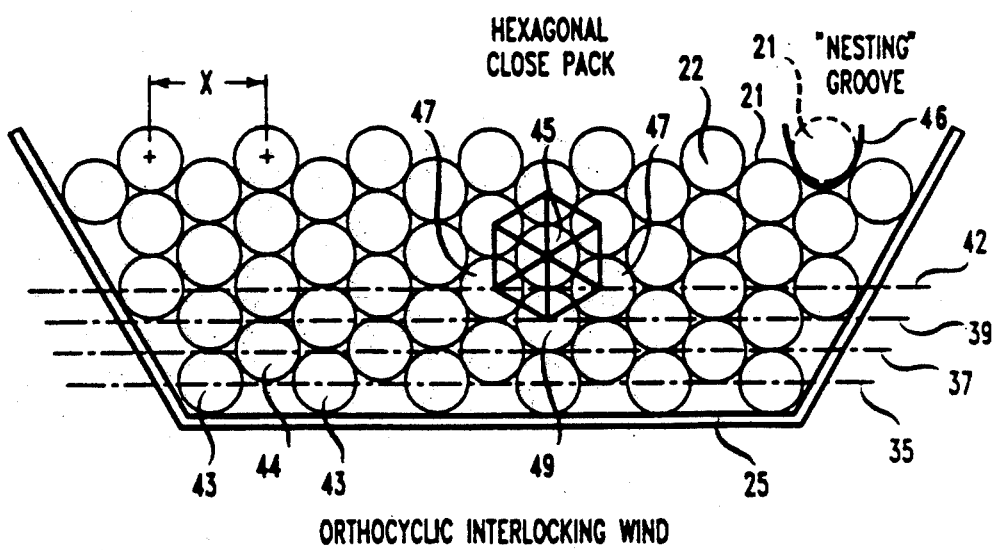
FIG. 4 ORTHOCYCLIC INTERLOCKING WIND

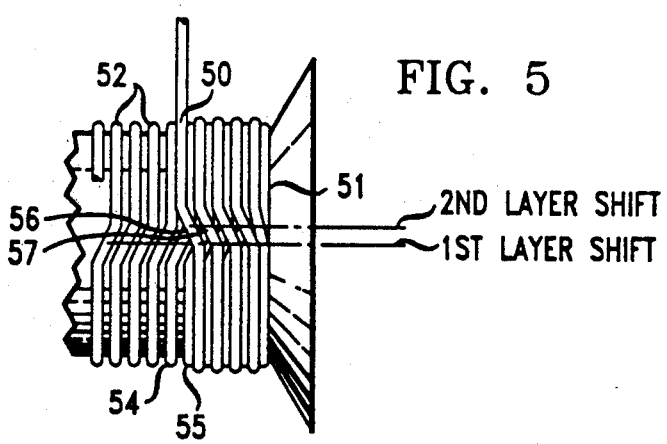
FIG. 5
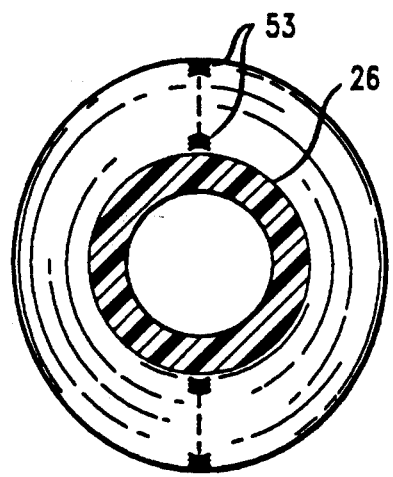
FIG. 6
(PRIOR ART)
FIG. 7
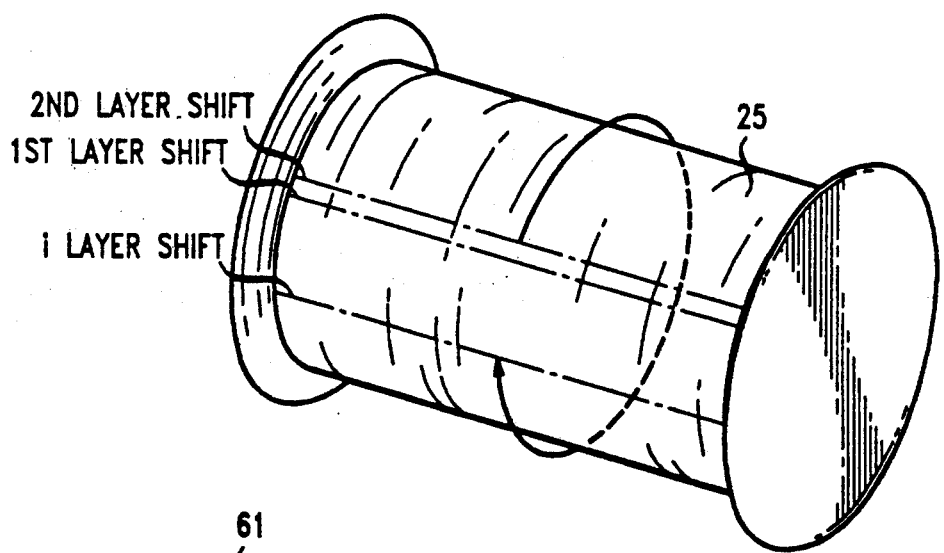
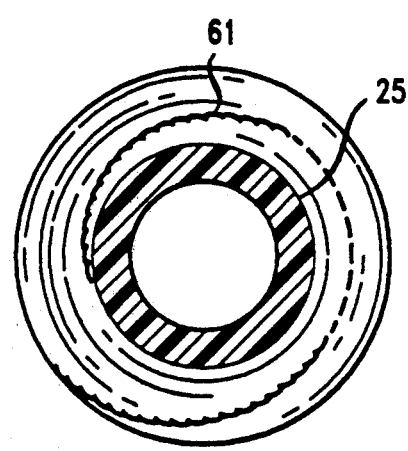
FIG. 8

INTERLOCKING WIND, NON-TAPERED

INTERLOCKING WIND, FLANGELESS END

OPTICAL FIBER PACKAGE AND METHOD OF MAKING

CROSS-REFERENCE TO RELATED APPLICATION

This application is a continuation-in-part application of application Ser. No. 07/708,414 which was filed on May 31, 1991, now abandoned, in the names of D. E. Fritz, C. J. Lever, and D. E. West.

TECHNICAL FIELD

This invention relates to an optical fiber package and to methods of making same. More particularly, the invention relates to a wound package of optical fiber which exhibits low loss, high density and excellent stability.

BACKGROUND OF THE INVENTION

Optical or lightguide fibers are inherently versatile as a transmission medium. All forms of information, be it voice, video or data, can be carried on an optical fiber. The most popular medium for lightwave transmission is glass, a solid whose structure is amorphous or random, as opposed to the crystalline structure that normally results when molten materials solidify. Optical fibers for lightwave communications are drawn from a preform which includes an elongated cylinder of glass having an inner core and an outer cladding with the diameters of the core and the cladding being in the same ratio in the fiber as they are in the preform.

In a drawing system, the preform is fed into a heated region where it is necked down to the size of the optical fiber as the fiber is pulled from the heat zone. After the diameter of the optical fiber is measured, one or more protective coatings are applied and the material forming the protective coatings is cured on the drawn fiber.

Typically, the drawn, coated optical fiber is taken up by winding convolutions of the fiber in layers on plastic spools in such a manner that end portions of the fiber on each spool are available for testing. The spools of drawn, tested fiber are used subsequently to supply ribbon and/or cabling processes and apparatus.

The winding during takeup must be carefully controlled, and collection of the fiber at low tension is necessary in order to minimize damage to the fiber or the coating thereon and to reduce the effect of microbending and macrobending losses on the transmission media. Therefore, the winding tension is minimized and the distribution of fiber across a surface of a hub of a spool is controlled to provide a desired profile of the package and to facilitate unwinding in a subsequent operation.

In the prior art, several patterns of winding have been used. First there is a pattern which is referred to as a spiral close wind in which successive convolutions of each layer engage one another. This may result in maximum packing density, but, often times, crossover of one convolution over an adjacent one in the same layer occurs, particularly in view of the very small diameter of the coated fiber, i.e. about 250 microns, and in view of the relatively low tension under which optical fiber is wound during takeup. Such crossovers are referred to as backwinding. Crossovers can lead, undesirably, to loss due to bending.

Steps have been taken to overcome the problem of backwinding. This has been accomplished by spacing apart the convolutions of the wound fiber in each layer. Typically, the spacing has been on the order of the product of about 1.2 to 1.4 and the diameter of the coated optical fiber. However, this remedial approach has led to other problems. It has been found that the resultant package is not as stable as desired and the package deteriorates during the course of normal handling. Also, the density of such a package suffers.

Another problem has been observed in spirally wound packages. Inasmuch as each convolution of the wound fiber is angled to a plane normal to the axis of the spool hub, a mismatch occurs between outer convolutions of each layer and flanges of the spool on which the fiber is wound. As a result, portions of successive layers may drop into gaps between those outer convolutions and the flanges, causing problems during payout.

In order to overcome the problem of mismatch between spool flanges and spirally wound convolutions, the prior art includes a winding pattern which is referred to as an orthocyclic wind. In an orthocyclic close wind, successive convolutions are adjacent to each other but at a predetermined location about the circumference of each of the convolutions, a distributor of the optical fiber is caused to move in a direction generally parallel to the axis of the spool on which the fiber is being wound to cause a jog in each of the convolutions.

Notwithstanding a desire to provide a more stable, low loss package, none of the presently used winding patterns appear to have achieved same. What is sought after and what seemingly has not yet appeared in the prior art is an optical fiber package having excellent stability, high density and low loss. Such a package should be able to be provided on presently available spools with minor modifications of winding apparatus.

SUMMARY OF THE INVENTION

The foregoing problems of the prior art have been overcome with the optical fiber package of this invention. A package of wound optical fiber comprises a winding surface, which may be cylindrical, and a plurality of layers of optical fiber wound about the surface. Each layer comprises a plurality of convolutions of optical fiber with each two adjacent convolutions in each layer being spaced apart such that convolutions of adjacent layers which are aligned with each other along a plane which is normal to the winding surface are in engagement with each other. Each convolution in each layer after an innermost layer crosses transversely optical fiber of an immediately preceding layer in two relatively closely spaced locations and such that crossovers in successive layers are staggered circumferentially. In a preferred embodiment, the distance between centers of corresponding portions of each two adjacent convolutions in a layer is in the range of the product of about 1.70 to 1.75 and the outer diameter of the optical fiber.

In a method of providing a package of optical fiber, a spool is mounted in a takeup apparatus. Then, a plurality of layers of optical fiber which typically includes at least one layer of a coating material are wound about an outer surface of a hub of the spool. Each layer includes a plurality of convolutions of optical fiber. Each two adjacent convolutions in each layer are spaced apart such that convolutions of adjacent layers which are aligned with each other along a plane which is normal to the winding surface are in engagement with each other. The winding is caused to occur so that each convolution in each layer after an innermost layer crosses transversely optical fiber of an immediately preceding layer in two relatively closely spaced locations and such that the crossovers in successive layers are staggered circumferentially. In a preferred embodiment, the distance between centers of corresponding portions of said each two adjacent convolutions is equal to the product of a multiplier in the range of about 1.70 to 1.75 and the outer diameter of the optical fiber. As each layer is wound on the spool, nesting grooves are formed between adjacent ones of the convolutions in each layer to receive convolutions of the next successive layer. Such a winding pattern is referred to as an interlocking one.

BRIEF DESCRIPTION OF THE DRAWING

Other features of the present invention will be more readily understood from the following detailed description of specific embodiments thereof when read in conjunction with the accompanying drawings, in which:

FIG. 1 depicts a portion of an initial layer of convolutions of optical fiber of an optical fiber package of this invention;

FIG. 2 is a front elevational view of a portion of an initial layer of a portion of a prior art optical fiber package;

FIG. 3 is a front elevational view of a portion of an initial layer of a portion of another prior art optical fiber package;

FIG. 4 is an enlarged schematic sectional view of a portion of the optical fiber package of FIG. 1 showing in cross section convolutions of each of a plurality of layers as they have been wound on a cylindrical winding surface of a spool which extends between innermost surfaces of tapered flanges of the spool;

FIG. 5 is a detail view of a winding arrangement to show crossover locations of convolutions of a layer over fiber of a previous layer;

FIG. 6 is an end elevational view of a spool in which crossovers appear as in a prior art winding arrangement;

FIGS. 7 and 8 are perspective and elevational detail views of a winding arrangement of this invention in which crossover locations are staggered about the circumference of the spool;

DETAILED DESCRIPTION

Figure 9:
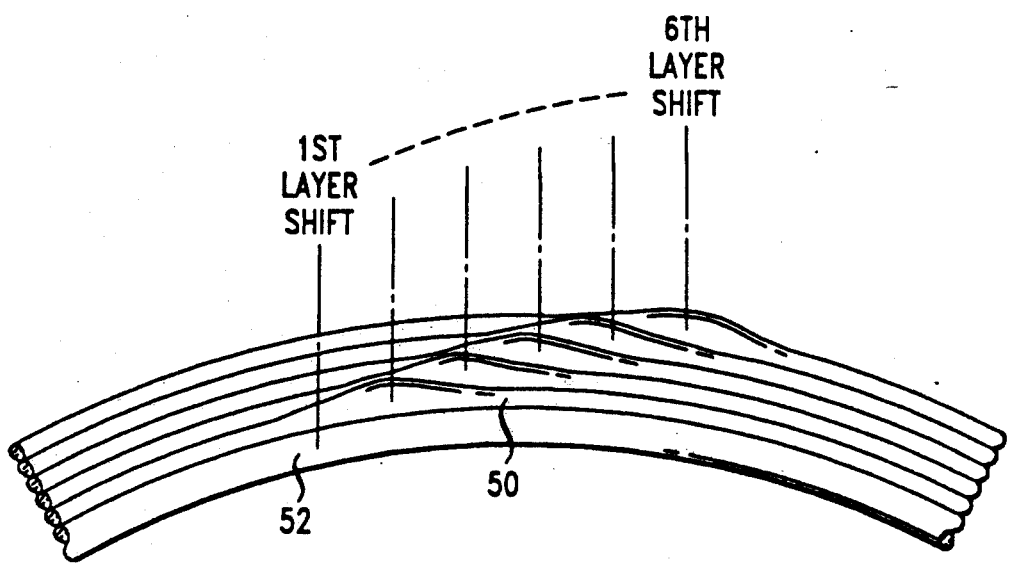
FIGS. 9 and 10 are enlarged elevational and plan views of the staggered crossover arrangement of the package of this invention.

Referring now to FIG. 1, there is shown a portion of a package which is designated generally by the numeral 20 and which is destined to include a plurality of convolutions 21—21 of optical fiber 22, which includes one or more coatings, disposed in a plurality of layers 24—24. In FIG. 1 only a portion of the initial layer 24 is shown. The package 20 includes a spool 23 including a hub 26 which in the embodiment shown includes a cylindrically shaped winding surface 25. The diameter of the winding surface of the hub 26 is equal at least to the product of about 200 and the outer diameter of the optical fiber being wound thereon. The winding surface extends between two flanges 27—27, only one of which is shown in FIG. 1. Each flange 27 in the preferred embodiment includes a tapered surface 29 which is engaged by outer ones of the convolutions 21—21 of each of the layers 24—24.

As can be seen in FIG. 1, at a predetermined point in the wrap of each convolution, a distributor (not shown) steps laterally in a direction parallel to a longitudinal axis 30 of the spool 23. This causes the convolutions each to be provided with an offset or dog-leg portion 31. Such a pattern which has been used in the past (see FIG. 2) is referred to as an orthocyclic winding pattern. The orthocyclic pattern evolved in order to cause the majority of each convolution to be substantially parallel to a plane which is normal to the axis 30 and which is disposed at the junction of the flange and the hub. Otherwise, with a spiral wind not having such an offset in each convolution (see FIG. 3), a mismatch occurs with those convolutions adjacent to the flanges.

It should also be observed from a comparison of FIGS. 1, 2 and 3 that the orthocyclic and the spiral winds of FIGS. 2 and 3, respectively, are what are referred to as close winds. That is, adjacent convolutions of each layer are in engagement with one another.

In contrast to close wind patterns, the winding pattern of the package 20 of this invention is such that in a method of making the package the convolutions 21—21 are spaced apart in what is referred to as an orthocyclic interlocking wind. Not only are the convolutions of the package 20 of this invention spaced apart, they are spaced apart in a particular manner in order to achieve nesting. As can be seen in FIG. 4, wherein each circle represents a cross section of a convolution normal to a longitudinal axis of the fiber, the adjacent convolutions of each layer are spaced apart such that each inner convolution of the next successively wound layer is tangent to each of two convolutions of the last previously wound layer. As a result, each inner convolution of each layer after an innermost layer, which engages the winding surface 25, is nested between convolutions of the previous layer.

Furthermore, and as also can be seen in FIG. 4, the package 20 is provided with additional rigidity. Each layer after the two innermost layers is such that each inner convolution thereof not only is tangent to two convolutions of the last wound layer but also engages a convolution of an earlier wound layer which is two removed therefrom and which is aligned with the later wound convolution along a plane which is normal to the winding surface.

For example, in FIG. 4, the numeral 35 is used to designate an innermost layer of convolutions and has a leader which extends to a line through the centers of portions of the convolutions thereof. Likewise, numerals 37, 39 and 42 are used to designate the next successive layers, proceeding outwardly from the winding surface 25. As is seen, convolutions 43—43 of optical fiber 22 of the layer 35 engage the winding surface 25. Each convolution 44 of the layer 37 engages each of two adjacent convolutions 43—43 of the layer 35. Further, after the two innermost layers 35 and 37, each inner convolution 45, after those adjacent to a flange or after an outermost convolution, not only engages two adjacent convolutions of the last wound layer but also a convolution of the layer two removed therefrom. For example, the convolution 45 engages two adjacent convolutions 47—47 of the layer 42 and a convolution 49 of the layer 39. Advantageously, this provides a three point support for a substantial number of the convolutions with respect to priorly wound convolutions, resulting in immediate nesting stability. As each layer of convolutions, after the two innermost layers, is wound, in accordance with methods of this invention a nesting groove 46 (see FIG. 4) is provided between adjacent ones of the convolutions of each layer.

This arrangement after the innermost layer and particularly after the two innermost layers provides for the formation of grooves or pockets, as they also may be termed, each adapted to receive a convolution of the next succeeding layer. Such an arrangement is advantageous over those of the prior art in which three point support was provided, but wherein the three point support was not symmetrical and hence unbalanced until the next successive adjacent wrap was made. Contrastingly, in this arrangement, the symmetric support for each inner convolution of each successive layer is immediate.

In order to achieve superior stability, each nesting groove must be provided in a particular manner. In a preferred embodiment, the nesting which is shown in FIG. 4 is accomplished by causing the center to center spacing, X, between corresponding portions of adjacent convolutions to be equal to the product of a multiplier in the range of about 1.70 to 1.75 and the diameter of the coated optical fiber being wound.

The multiplier which is determined from geometrical considerations is $\sqrt{3}$, i.e. 1.732, and the spacing is the product of that multiplier with some tolerance and the diameter of the coated optical fiber being wound. By using a multiplier in the foregoing range of about 1.70 to 1.75 for the spacing between two supporting adjacent convolutions, the lowermost point of a convolution of the next layer which is nested therebetween will be disposed along a line which extends between the centerline axes of the transverse cross sections of those two supporting, adjacent convolutions. Also, the topmost point of that convolution which is so nested will be disposed along a line which extends between centerline axes of the transverse cross sections of two adjacent convolutions of the next successive outer layer.

For example, returning to FIG. 4, it can be seen that an innermost point of the convolution 45 is disposed along the line which extends through the center of the transverse cross sections of the convolutions in the layer 42. Further, the outermost point of the convolution 45 is disposed along a line which extends through the centers of the transverse cross sections of the next successive outer layer.

The resulting package from a packing standpoint may be referred to as a hexagonal close pack. Such nomenclature is derived from the six point support of inner convolutions of each layer (see FIG. 4).

As each successive layer of optical fiber is wound on top of a previous layer on a spool, each convolution 50 (see FIG. 5) of the layer currently being wound crosses two convolutions of the previous layer. In other words, each convolution of each successive layer 51 twice crosses transversely optical fiber of convolutions 52—52 of an immediately preceding layer. In the prior art, it has been typical for the locations of crossovers to be spaced 180° apart (see FIG. 6). Further, as is shown in FIG. 6, it is commonplace in the prior art that crossovers 53—53 in successive layers are aligned radially of the hub 26. As a result, there occurs a buildup of fiber in two well defined locations about the circumference of the package. This may cause problems in attempting to wind a tight package as the winding process proceeds outwardly away from the hub.

This problem of the prior art has been overcome by the optical fiber package of this invention. As is seen in FIG. 5 transverse crossovers of each convolution of each layer over fiber in an immediately preceding layer are maintained in close proximity of each other. The convolution 50 (see FIG. 5) for example, crosses a convolution 54 and a convolution 55 of the immediately preceding layer in closely spaced locations 56 and 57. Of course, it should be understood that any outward protrusion of a single layer caused by such crossovers is relatively minor because of the hereinbefore mentioned very large ratio of winding surface diameter to the outer diameter of the optical fiber being wound.

Figure 10:
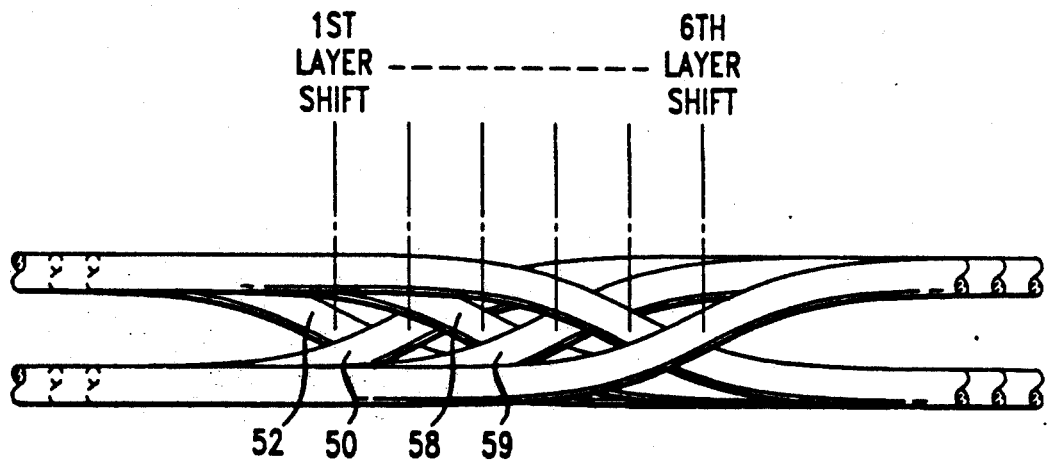

Further, in order to avoid a concentrated build-up of optical fiber in any one circumferential location about the package, the crossover locations as among successive layers are staggered in a circumferential direction (see FIGS. 7-10). FIG. 7 depicts a shifting as between crossovers of convolutions of a second layer and successive layers to an i th layer over convolutions of a first layer. In FIG. 8, a curve 61 is a trace of the crossover locations of successive layers wound on a spool. As can be seen in FIGS. 9 and 10, convolutions 50—50 which twice cross fiber in a layer therebelow are not aligned with crossover locations of convolutions in subsequent layers such as, for example, crossover locations 58 and 59 shown in FIG. 10. The winding is accomplished to stagger those crossover locations as among successive layers and as that the crossover locations move around the circumference as winding proceeds from one layer to the next.

Figure 11:
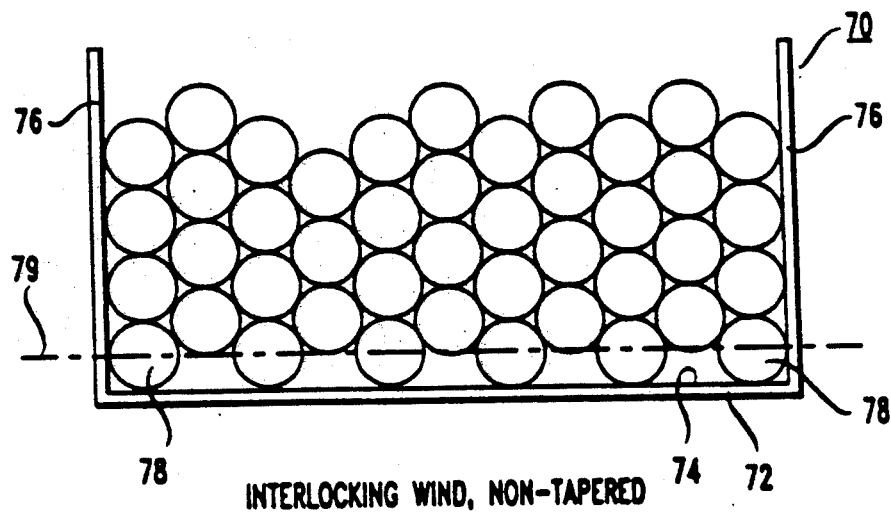
FIG. 11 is a front elevational view of a portion of a spool having inner flange surfaces which are normal to a winding axis of the spool and having convolutions wound in an interlocking pattern thereon.

The spools having portions depicted in FIGS. 1 and 4 each have tapered flanges such as a tapered surface 29 for example in FIG. 1 which connects the hub to an outer portion of the flange. Other configurations for a spool of the package of this invention may be used. For example, in FIG. 11, a spool 70 includes a hub 72 having a winding surface 74 and two flanges 76—76. As can be seen, an inner surface of each of the flanges 76—76 is normal to the winding surface. As a result, outer convolutions of each layer are in engagement with the inner surfaces of the flanges. For example, outer convolutions 78—78 of an innermost layer 79 engage the flanges 76—76. Again as in FIG. 4, the pattern is interlocking with the center to center spacing being equal to the product of about 1.70 to 1.75 and the outer diameter of the coated optical fiber. As a result, as each layer after the first two is wound, a nesting groove is provided between each two adjacent convolutions with each inner convolution being the center of a hexagonal close pack.

Figure 12:
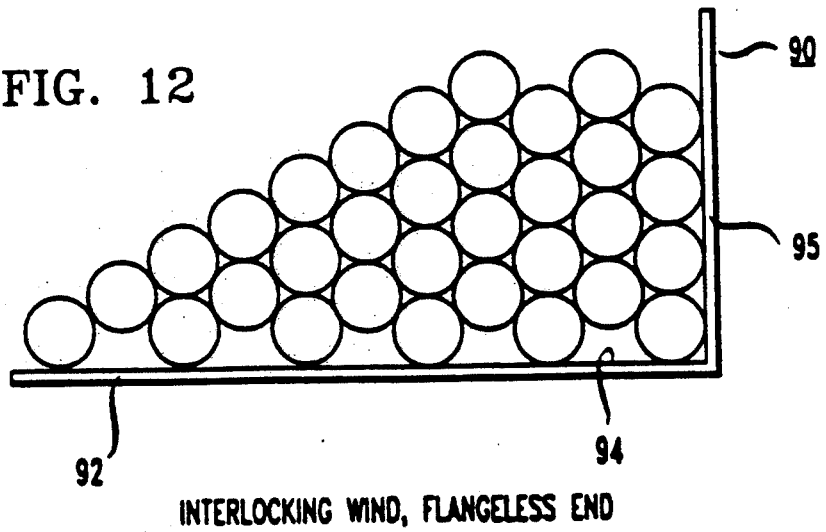
FIG. 12 is a front elevational view of a portion of a spool with convolutions of optical fiber along one end of a winding surface forming a tapered configuration and with the convolutions being wound in an interlocking pattern.

Lastly, a package of this invention may take the configuration shown as FIG. 12. A spool 90 includes a hub 92 having a winding surface 94 and a flange 95 having an inner surface which is normal to the hub. An opposite end of the hub is flangeless. Instead, layers are tapered inwardly so that each succeeding layer progressively outwardly from the hub has fewer convolutions. Further, after the two innermost layers, each outermost convolution of each layer which is adjacent to the flangeless end is disposed in a nesting groove. The package of FIG. 12 also is exceptionally stable.

The packages of this invention overcome the problems of the prior art. They have superior stability with the fiber in each exhibiting low loss. Also, the density is very high, being comparable to that of close wound packages, and exhibiting far fewer problems than in packages of close wind.

In the past, spools on which optical fiber was wound included a foam material on the winding surface of the hub to minimize stress imparted to the fiber. It has been determined that with the winding patterns of the packages of this invention, the fiber may be wound on relatively rigid type surfaces such as those made of polymer materials as well as of foam. Also, the tension during winding need not be as low, thereby reducing the need for expensive control equipment.

The hub of a spool of packages of this invention has been described and/or shown as being cylindrical. It should be understood that spool hubs having other configurations, such as a truncated conical shape, for example, may be used.

It is to be understood that the above-described arrangements are simply illustrative of the invention. Other arrangements may be devised by those skilled in the art which will embody the principles of the invention and fall within the spirit and scope thereof.

We claim:

1. A package of wound optical fiber, said package comprising:
   a winding surface having a diameter which is equal to the product of at least 200 and an outer diameter of the optical fiber being wound thereon; and
   a plurality of layers of optical fiber wound about said surface, each layer comprising a plurality of convolutions of optical fiber with each two adjacent convolutions in each layer being spaced apart such that convolutions of adjacent layers which are aligned with each other along a plane which is normal to the winding surface are in engagement with each other, each convolution in each layer after an innermost layer which engages the winding surface crossing transversely at least two convolutions of optical fiber of an immediately preceding layer in two relatively closely spaced locations in a single region of the convolutions of said immediately preceding layer and such that crossovers in successive layers are staggered circumferentially of the winding surface.

2. The package of claim 1, wherein said convolutions are spaced apart such that the distance between centers of corresponding portions of said each two adjacent convolutions in each layer is equal to the product of a multiplier in the range of about 1.70 to 1.75 and the outer diameter of the optical fiber.

3. The package of claim 2, wherein said distance is such that each inner convolution in each layer after the two innermost layers is in engagement with each of two adjacent convolutions of the immediately preceding layer and with a convolution of the layer which precedes the immediately preceding layer.

4. The package of claim 1, wherein said winding surface comprises a surface of a hub of a spool which is comprised of a foam material.

5. The package of claim 1, wherein said winding surface comprises a surface of a hub which is made of a polymeric material.

6. The package of claim 1, wherein the optical fiber is wound on a spool having a cylindrical winding surface which extends between two flanges.

7. The package of claim 6, wherein each flange includes a portion which tapers from an outer diameter that is larger than the outer diameter of the cylindrical winding surface and which tapers from the outer diameter thereof to the outer diameter of the cylindrical winding surface.

8. The package of claim 6, wherein each flange has an innermost face which engages outer convolutions of ones of the layers, said innermost face being normal to a longitudinal axis of the cylindrical winding surface.

9. The package of claim 6, wherein the optical fiber is wound on a spool having only one flange at one end of a hub with an outermost convolution of each successive layer adjacent to a flangeless end of the hub being stepped toward the flanged end from an immediately preceding layer.

10. The package of claim 1, wherein at a predetermined location of each convolution, said each convolution includes an offset between axes of portions of said each convolution adjacent to said predetermined locations.

11. A method of providing a package of optical fiber, said method including the steps of:
    providing a spool having a winding surface having a diameter which is equal at least to the product of about 200 and the outer diameter of the optical fiber to be wound thereon; and
    winding a plurality of layers of optical fiber about an outer surface of said spool such that each layer comprises a plurality of convolutions of optical fiber with each two adjacent convolutions in each layer being spaced apart such that convolutions of adjacent layers which are aligned with each other along a plane which is normal to the winding surface are in engagement with each other and such that each convolution in each layer after an innermost layer which engages the winding surface crosses transversely at least two convolutions of optical fiber of an immediately preceding layer in two closely spaced locations in a single region of the convolutions of said immediately preceding layer and such that crossovers in successive layers are staggered circumferentially of the winding surface.

12. The method of claim 11, wherein said convolutions are spaced apart such that the distance between centers of corresponding portions of said each two adjacent convulutions is equal to the product of a multiplier in the range of about 1.70 to 1.75 and the outer diameter of the optical fiber.

13. The method of claim 11, wherein said distance is such that each inner convolution in each layer after the two innermost layers is in engagement with each of two adjacent convolutions of the immediately preceding layer and with a convolution of the layer which precedes the immediately preceding layer.

14. The method of claim 11, wherein at a predetermined location of each convolution, said each convolution includes an offset between axes of portions of said each convolution adjacent to said predetermined location.

* * * * *